(12) United States Patent
Sharp

(10) Patent No.: US 10,953,960 B1
(45) Date of Patent: Mar. 23, 2021

(54) SELF-PROPELLED EMISSIONS CONTROL SERVICING WATERCRAFT

(71) Applicant: Robert John Sharp, Camarillo, CA (US)

(72) Inventor: Robert John Sharp, Camarillo, CA (US)

( * ) Notice: Subject to any disclaimer, the term of this patent is extended or adjusted under 35 U.S.C. 154(b) by 55 days.

(21) Appl. No.: 16/253,202

(22) Filed: Jan. 21, 2019

Related U.S. Application Data

(60) Provisional application No. 62/620,183, filed on Jan. 22, 2018.

(51) Int. Cl.
*B63B 35/00* (2020.01)
*B01D 53/00* (2006.01)
*B63H 19/00* (2006.01)

(52) U.S. Cl.
CPC .............. *B63B 35/00* (2013.01); *B01D 53/00* (2013.01); *B63H 19/00* (2013.01); *B63B 2211/00* (2013.01)

(58) Field of Classification Search
CPC ..... B63B 35/00; B63B 2211/00; B63B 59/02; B63B 35/28; B63B 35/44; B63B 35/442; B63B 35/4486; B63B 35/34; B63B 27/60; B01D 53/00; B63H 19/00; B63H 21/165; B63H 21/20; B63H 23/26; B63H 21/17; E02B 3/26
See application file for complete search history.

(56) References Cited

U.S. PATENT DOCUMENTS

| | | | | |
|---|---|---|---|---|
| 1,404,525 | A * | 1/1922 | Hotchkiss | F04D 1/04 415/116 |
| 3,585,806 | A * | 6/1971 | Lawrence | B63B 35/03 405/166 |
| 3,631,833 | A * | 1/1972 | Shimanckas | B63H 25/30 440/55 |
| 3,653,349 | A * | 4/1972 | Brown | B63B 35/4413 114/265 |
| 3,749,162 | A * | 7/1973 | Anders | E21B 43/01 166/354 |
| 3,828,719 | A * | 8/1974 | Cooke | B63H 23/26 440/61 R |
| 3,938,676 | A * | 2/1976 | Croese | B63B 27/00 414/138.6 |
| 4,361,104 | A * | 11/1982 | Lloyd, III | B63B 35/44 114/258 |
| 4,878,864 | A * | 11/1989 | Van Bentem | B63H 20/08 440/5 |
| 5,111,763 | A * | 5/1992 | Moerbe | B63B 35/70 114/246 |
| 5,460,301 | A * | 10/1995 | Ebinger | E04G 21/04 222/626 |
| 7,258,710 | B2 * | 8/2007 | Caro | B01D 53/92 110/121 |
| 8,402,746 | B2 * | 3/2013 | Powell | B63H 21/32 60/281 |
| 9,089,806 | B2 * | 7/2015 | Powell | B01D 46/42 |

(Continued)

*Primary Examiner* — Justin M Jonaitis

(57) ABSTRACT

In accordance with one embodiment, a self-propelled emissions control servicing watercraft that does not require transportation by tugboat and utilizes a hydraulic power unit that supplies hydraulic power to a hydraulic positioning arm during "service mode" and alternately uses the same hydraulic power unit to supply hydraulic power to hydraulic propulsion thrusters during "mobile mode".

2 Claims, 2 Drawing Sheets

(56) References Cited

U.S. PATENT DOCUMENTS

| | | | | |
|---|---|---|---|---|
| 2006/0213197 A1* | 9/2006 | Caro | .................... | F01N 3/2066 |
| | | | | 60/685 |
| 2010/0180559 A1* | 7/2010 | Caro | ....................... | F23J 11/04 |
| | | | | 55/385.1 |
| 2015/0337759 A1* | 11/2015 | Lehmann | ................ | F02B 63/04 |
| | | | | 290/2 |
| 2016/0252030 A1* | 9/2016 | Hagiwara | ............... | F02D 41/04 |
| | | | | 123/253 |
| 2016/0368567 A1* | 12/2016 | Westerweel | ............. | B63B 1/38 |

* cited by examiner

SELF-PROPELLED EMISSIONS CONTROL SERVICING WATERCRAFT

CROSS-REFERENCE TO RELATED APPLICATIONS

This application claims the benefit of PPA Ser. No. 62/620,183, filed 2018 Jan. 22 by the present inventor, which is incorporated by reference.

FEDERALLY SPONSORED RESEARCH

None.

SEQUENCE LISTING

None.

BACKGROUND

Servicing watercraft, such as an emissions control system, provide services to other watercraft at berth, at anchorage, or underway. The servicing watercraft are transported using typically two tugboats. The tugboat(s) move the servicing watercraft to and from the servicing watercraft's home berth and to and from serviced watercrafts. Once the tugboat(s) move the servicing watercraft into position next to a serviced watercraft, then a connecting procedure is initiated. The tugboat(s) hold the servicing watercraft next to the serviced watercraft until the servicing watercraft is secured with mooring lines, or with alternative mooring devices, to the serviced watercraft. Once the servicing watercraft is secure, the servicing watercraft may begin operations, and the tugboats are then free to leave to perform other tugboat duties. In the case of an emissions control system, these operations consist of attaching a conduit to the serviced vessel's exhaust pipe to draw exhaust gas through the conduit to an emissions treatment system located on a servicing watercraft to remove contaminants from the exhaust gas before releasing the exhaust gas into the atmosphere.

Once a serviced watercraft approaches the completion of its stay, it prepares to depart. As part of the departing procedure, the servicing watercraft is commanded to disconnect from the serviced vessel. The disconnecting procedure is opposite of the connecting procedure, whereas tugboat(s) are again required to travel to the location of the servicing watercraft, hold the servicing watercraft next to the serviced watercraft until the servicing watercraft is free from mooring lines or other mooring devices. The tugboat(s) then pull the servicing watercraft away from the serviced watercraft and move the servicing watercraft to the next location.

U.S. Pat. No. 7,258,710 to Caro et al. dated Aug. 21, 2007, discloses a maritime emissions control system. However, this patent prefers an Unpowered Seagoing Barge that is not self-propelled as a platform for the system. U.S. Pat. No. 8,327,631 to Caro et al. dated Dec. 11, 2012, discloses an air pollution control system for ocean-going vessels, but it also prefers an Unpowered Seagoing Barge.

However, I have encountered several disadvantages when using an unpowered seagoing barge for an emissions control system that requires tugboats to move, connect, and disconnect an unpowered servicing watercraft:

Disadvantage 1: One disadvantage is that many vessel trips are required when tugboats move an emissions control servicing watercraft. The emissions control servicing watercraft itself must make a trip to the serviced vessel. Then, after the serviced vessel call is complete, the emissions control servicing watercraft then travels away from the serviced vessel to its next destination, either to another serviced vessel to a home berth, for example. When tugboats are used to move the emissions control servicing watercraft, then each tugboat makes a first trip to accompany the emissions control servicing watercraft, then a second trip to travel to the next tugboat destination. When the serviced vessel call is near completion, the tugboat makes a third trip to retrieve the emissions control servicing watercraft, and then a fourth trip to move the emissions control servicing watercraft to its next destination. Thus, each tugboat makes two trips for every one trip of an emissions control servicing watercraft. Typically two tugboats are used per event, resulting in a minimum of ten vessel trips per serviced vessel call, two for the emissions control servicing watercraft, four for the first tugboat, and four for the second tugboat.

Disadvantage 2: Another disadvantage is that additional vessel trips (even more than the ten normally-required trips) may be necessary when tugboats are used to move an emissions control servicing watercraft. Sometimes certain events occur that require moving the emissions control servicing watercraft, such as emergencies and repositioning of the emissions control servicing watercraft. Each of these events typically requires two tugboats, and two vessel trips per tugboat, resulting in four additional vessel trips per additional event.

Disadvantage 3: Yet another disadvantage is that the tugboat vessel trips described above cause additional emissions. In the case of emissions control servicing watercraft, it is counter-productive to use tugboats, which produce significant emissions while moving the servicing watercraft. Tugboats reduce the overall effectiveness of an emissions control servicing watercraft because the tugboat emissions counteract the goal of emissions reductions. Many tugboats do not have sufficient emissions controls themselves, thereby significantly reducing the net emissions reductions.

Disadvantage 4: Yet another disadvantage is that each of the tugboat vessel trips described above requires one additional crew per tugboat. Typically there are at least two crew members per tugboat. The additional crew(s) add cost, thereby reducing the cost-effectiveness of the emissions control servicing watercraft.

Disadvantage 5: Yet another disadvantage is that each of the tugboat vessel trips described above requires additional fuel, which wastes energy and adds cost, thereby reducing the cost-effectiveness of the emissions control servicing watercraft.

Disadvantage 6: Yet another disadvantage is that each of the tugboat vessel trips described above reduces the useful life of each tugboat, which adds cost, thereby reducing the cost-effectiveness of the emissions control servicing watercraft.

Disadvantage 7: Yet another disadvantage of using tugboats to move an emissions control servicing watercraft is the danger of immobility of the servicing watercraft when secured to the serviced watercraft. If an emergency occurs in which the servicing watercraft needs to be removed because the servicing watercraft is be exposed to danger while secured next to the serviced watercraft, then an unscheduled tugboat request is initiated. Unfortunately, the tugboats may not be available on short notice. It may take many hours before at least one tugboat is available to disconnect the servicing watercraft from the serviced watercraft. Tugboats are typically scheduled in advance because they are busy working elsewhere in the harbor. Even if a tugboat could abandon its current work, the tugboat still must make the journey across the harbor to the location of the servicing watercraft. During this waiting period, loss of life or equipment could occur.

Disadvantage 8: Yet another disadvantage of using tugboats to move an emissions control servicing watercraft is the inability to reposition the servicing watercraft relative to the serviced watercraft. Sometimes it is necessary to adjust the position of the servicing watercraft. For example it may be necessary to a) move out of the way of potential falling containers, b) make room for a large vessel passing nearby in a narrow channel, c) reposition due to changing conditions caused by water currents, d) reposition due to changing conditions caused by changing ballasting of the serviced vessel, and/or e) make room for another servicing vessel such as a bunker fueling barge. This inability to reorient during the serviced vessel call can cause dangerous situations or can prevent cargo from being serviced. It is very undesirable to make an unscheduled tugboat call due to the additional cost of such a call, and also due to the amount of time it takes to obtain a tugboat.

Disadvantage 9: Yet another disadvantage of using tugboats to move an emissions control servicing watercraft is that it precludes the efficient use of a hydraulic power unit that is already necessary to supply hydraulic power to a hydraulic exhaust capture system, to also supply hydraulic power the propulsion system during alternate modes of operation, thereby resulting in increased capital cost.

SUMMARY

In accordance with one embodiment, a self-propelled emissions control servicing watercraft that does not require assistance from one or more tugboats to move from location to location. Furthermore, a self-propelled emissions control servicing watercraft that utilizes a hydraulic power unit that supplies hydraulic power to a hydraulic emissions capture system during a "service mode" and alternately uses the same hydraulic power unit to supply hydraulic power to propulsion thrusters during a "mobile mode."

DRAWINGS—FIGURES

The novel features which are characteristic of the present invention are set forth in the appended claims. However, embodiments, together with further objects and attendant advantages, will be best understood by reference to the following detailed description taken in connection with the accompanying drawings in which:

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
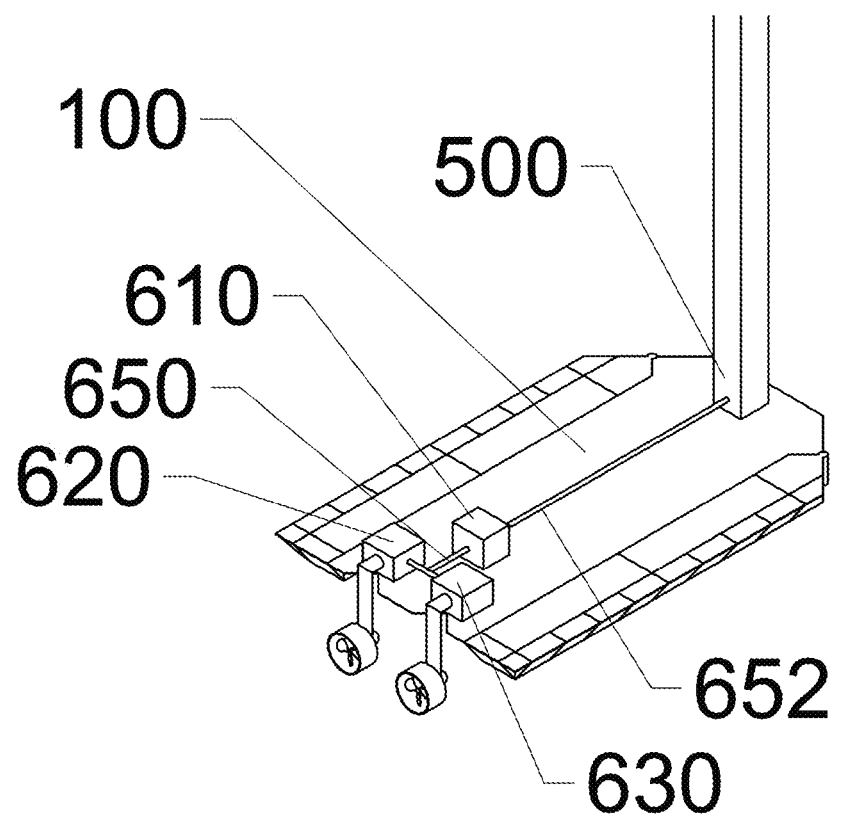
FIG. 1 shows a self-propelled emissions control servicing watercraft.

FIG. 1 shows one exemplary embodiment of a self-propelled emissions control servicing watercraft 100. The exemplary barge 100 is a self-propelled emissions control servicing watercraft, comprising an exhaust capture system 500. In this exemplary embodiment, exhaust capture system 500 comprises a tower and hydraulic arm. The output of at least one hydraulic power unit 610 connects to at least one hydraulic propulsion unit. In this exemplary embodiment, there are two hydraulic propulsion units: a port hydraulic propulsion unit 620, and a starboard hydraulic propulsion unit 630. The same hydraulic power unit 610 is also connected to exhaust capture system 500.

For emissions control servicing watercraft, the servicing watercraft is typically a barge. Barges work well for this purpose because they typically do not have to travel far, and stay within the harbor, or inside the breakwater, and do not need to travel in the open ocean. Barges are also wider than other types of watercraft, thereby providing more rolling stability, which is important for an emissions control servicing watercraft that uses a large exhaust capture system tower and arm to connect to a serviced vessel, thereby reducing relative motion. Other types of vessels are anticipated, such as hulled vessels and semi-submersible watercraft. Semi-submersible watercraft have the advantage of stability and compactness. However, semi-submersible watercraft are expensive compared to barges and hulled watercraft.

Alternative propulsion units include electric motor-driven propulsion units, battery electric drives, diesel-electric systems, or hydrocarbon-fueled engine-driven thrusters. In the case of an emissions control servicing watercraft, hydraulically-driven propulsion is preferred because one or more hydraulic power unit(s) can be shared between the thruster(s) and the capture system tower and arm. Hydraulic propulsion units, also called hydraulic thrusters or azimuth thrusters, may be obtained from, among others, Thrustmaster and Hydraulic Marine Systems. For barges, these thrusters are typically outboard systems, although "built-in" thrusters or "pod" thrusters could also be implemented. If a hulled vessel is used for the servicing watercraft, then a direct-drive internal combustion engine-powered propeller would likely be used.

Typically, at least two thrusters are required for barge operations. Four thrusters (one on each corner) is preferred if financially viable. Hydraulic outboard propulsion units typically include the ability to rotate the direction of thrust 360 degrees.

Typically, hydraulic thrusters are each is driven by diesel engines, with one diesel engine per thruster. For this exemplary embodiment, however, at least one hydraulic power unit(s) may be connected to at least one hydraulic thruster(s) as well as to the capture system tower and arm. Multiple hydraulic power units would provide redundancy, as an option. Each hydraulic power unit is preferably powered using an electric motor. Alternatively, an internal combustion engine could power each hydraulic power unit.

The exhaust capture system of an emissions treatment system typically uses hydraulic power to pivot the connection arm about the vertical axis and also to power the articulation of each joint in the arm. When a shared hydraulic power unit is used, care must be taken that the hydraulic power unit can supply sufficient pressure and flow of hydraulic fluid that is compatible with both the thruster system and the capture system tower and arm. One who is skilled in the art can design a hydraulic system that is sufficient to accommodate both hydraulic thrusters and an exhaust capture system.

Figure 2:
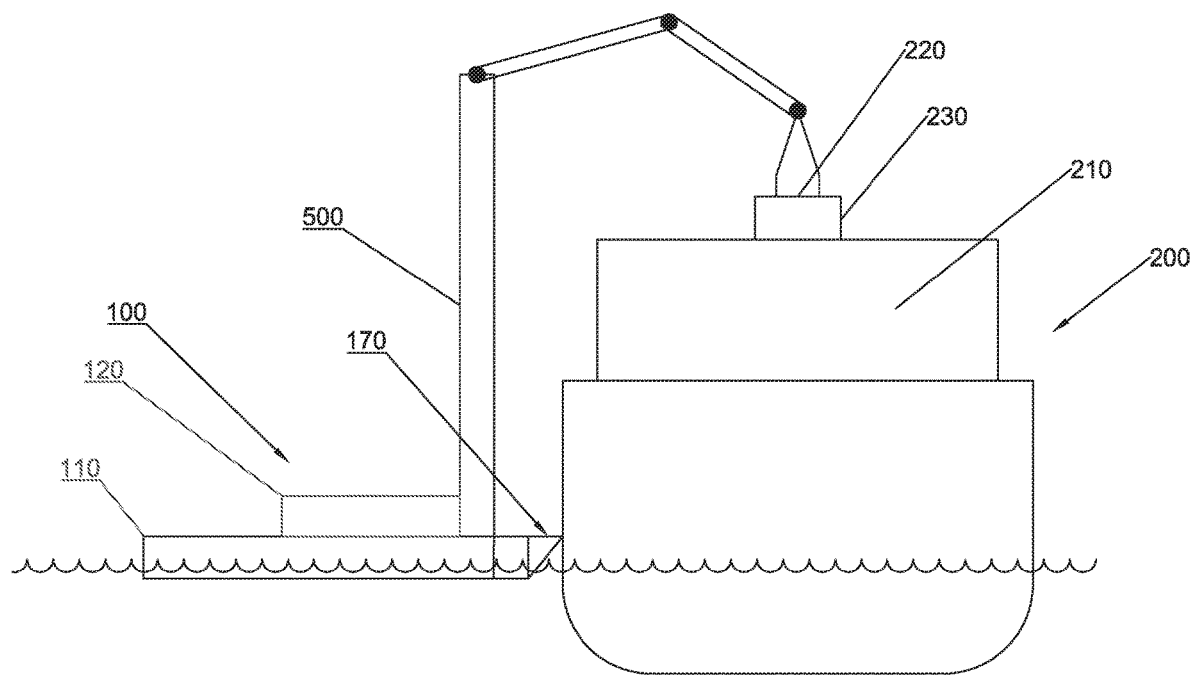
FIG. 2 shows an elevation view of an emissions control servicing watercraft operating next to a serviced watercraft.

FIG. 2 shows one exemplary embodiment of barge 100 as an emissions control servicing watercraft positioned directly adjacent to a serviced watercraft 200 (hereafter referred to as vessel 200). Exhaust capture system tower and arm 500 is located on barge 100. The exhaust pipes 220 of vessel 200 are located on top of funnel 230 which is located adjacent to or on top of superstructure 210. Fender 170 is attached to the side of barge 100 and serves as a soft interface between barge 100 and vessel 200.

REFERENCE NUMERALS

100 Self-propelled Emissions Control Servicing Watercraft
170 Fender System
200 Serviced Watercraft, or Vessel, or Oceangoing Vessel (OGV)
210 Superstructure
220 Exhaust Pipes
230 Funnel
500 Exhaust Capture System Tower and Arm
610 Hydraulic Power Unit
620 Port Hydraulic Propulsion Unit
630 Starboard Hydraulic Propulsion Unit
650 Hydraulic Piping, Hydraulic Propulsion System
652 Hydraulic Piping, Exhaust Capture System
Operation In one exemplary embodiment, as shown in FIG. 2, an emissions control servicing watercraft 100 is in operation next to oceangoing vessel 200. Vessel 200 may be at berth or at anchorage. Diesel engines produce electrical power for vessel 200. These diesel engines produce diesel exhaust, which contains particulate matter, oxides of nitrogen, and sulfur dioxide, which cause harm to human health and the environment. The auxiliary engines that generate electrical power for vessel 200 are deep inside the engine room, which is typically within superstructure 210. Exhaust pipes 220 from the diesel engines are located at the top of funnel 230. Normally, emissions emanate from exhaust pipes 220 into the atmosphere. However, when emissions control servicing watercraft barge 100 is connected, the diesel exhaust is collected by the exhaust capture system 500. The captured exhaust is purified by equipment on emissions control servicing watercraft 100.

Emissions control servicing watercraft 100 is positioned next to vessel 200 to get close enough for exhaust capture system 500 to connect to exhaust pipes 220. If emissions control servicing watercraft 100 is not self-powered, it has to be moved using at least one tugboat(s). Once emissions control servicing watercraft 100 is moved next to vessel 200, watercrfaft 100 is secured by mooring lines or the equivalent. Fenders 170 are used to create a soft interface between barge 100 and vessel 200. The fendering system maintains a suitable distance between barge 100 and vessel 200. The fendering provides a soft interface to prevent damage to painted metal surface of either watercraft, is durable enough to absorb the constant relative motion between the watercraft, and absorbs the constant impact from the frequent shocks caused by relative motion between the watercraft, waves, swells, and wakes from other vessels.

Once emissions control servicing watercraft 100 is secured to vessel 200, then an arm which is part of exhaust capture system 500 is hydraulically articulated such that the exhaust pipes of vessel 200 connect to conduits contained within exhaust capture system 500. The exhaust gas is then drawn through the conduits to an emissions processing systems on emissions control servicing vessel 100. The emissions processing systems purify the exhaust gas.

In one exemplary embodiment, as shown in FIG. 1, emissions control servicing watercraft 100 includes a propulsion system comprising a port hydraulic propulsion unit 620 and a starboard hydraulic propulsion unit 630. In this exemplary embodiment, a single hydraulic power unit 610 provides hydraulic power to both propulsion units. An alternative configuration is to have a hydraulic power unit for each hydraulic propulsion unit. Another alternative configuration is to have more than one hydraulic power units 610 for redundancy, but each hydraulic power unit 610 can be directed to any hydraulic propulsion unit. Alternatively, the propulsion system could be powered by diesel engine(s), or diesel-electric engine(s), or electric motor(s).

The exemplary embodiment that is shown in FIG. 1 also shows a connection from hydraulic power unit 610 to exhaust capture system 500, in addition to a connection to the hydraulic propulsion system. An emissions control servicing watercraft 100 has two modes of operation which are exclusive of each other. A first mode is for self-propulsion of the emissions control system servicing watercraft 100. A second mode is for operating the exhaust capture system 500. Once barge 100 is secured next to vessel 200, the propulsion system may be turned off, thereby freeing hydraulic power unit 610 to provide hydraulic power to exhaust capture system 500 for connection and disconnection. Once exhaust capture system 500 is disconnected and stowed, then hydraulic power can be again redirected to the propulsion system. Thus, a single hydraulic power unit 610 can supply hydraulic power to both the propulsion system and exhaust capture system 500, thus reducing the number of hydraulic power units required thereby reducing capital cost. This reduction in capital cost results in better overall cost-effectiveness.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

CONCLUSION, RAMIFICATIONS, AND SCOPE

Accordingly, the reader will see that a servicing watercraft that may be safely and effectively secured to another watercraft. Thus, the reader will see that at least one embodiment provides the following advantages:

A self-powered emissions control servicing watercraft 100 using a propulsion system has several advantages:

Advantage 1: An advantage of self-powered emissions control servicing watercraft 100 is that it reduces the minimum number of vessel trips from ten vessel trips to two vessel trips compared to using tugboats.

Advantage 2: Another advantage of self-powered emissions control servicing watercraft 100 is that tugboats are not required for events such as emergencies or repositioning, thereby reducing the number of vessel trips required.

Advantage 3: Yet another advantage of self-powered emissions control servicing watercraft 100 is that emissions are reduced, thereby increasing the overall effectiveness of emissions control servicing watercraft 100.

Advantage 4: Yet another advantage of self-powered emissions control servicing watercraft 100 is that it reduces the number of crew members, thereby reducing the cost of operation and increasing the cost-effectiveness of emissions control servicing watercraft 100.

Advantage 5: Yet another advantage of self-powered emissions control servicing watercraft 100 is that the number vessel trips is reduced, thereby reducing the consumption of fuel, which reduces cost, and increases the cost-effectiveness of emissions control servicing watercraft 100.

Advantage 6: Yet another advantage of self-powered emissions control servicing watercraft 100 is that wear and tear on tugboats in decreased, thereby reducing cost and increasing the cost-effectiveness of emissions control servicing watercraft 100.

Advantage 7: Yet another advantage of using a self-power emissions control servicing watercraft 100 and not using tugboats is a reduced danger of immobility when secured to vessel 200. If an emergency occurs, where the emission control servicing watercraft 100 is in a dangerous situation while secured next to vessel 200, then a self-propelled emissions control servicing watercraft 100 can be moved without waiting for tugboats. Since tugboats may not be available on short notice, and it could take many hours before at least one tugboat is available, a potentially dangerous situation can be avoided, thereby preventing a possible loss of life, injury, or equipment damage.

Advantage 8: Yet another advantage of a self-power emissions control servicing watercraft 100 is the ability to reposition itself relative to vessel 200. Sometimes it is necessary to adjust the position of emissions control servicing watercraft 100. For example, it may be necessary to move out of the way of potential falling containers, or to make room for a large vessel passing nearby in a narrow channel, or to reposition due to changing conditions caused by water currents, or to reposition due to changing conditions caused by the changing ballasting of the serviced vessel, or to make room for another servicing vessel such as a bunker fueling barge. This ability to reposition without using tugboats during the servicing period can prevent dangerous situations and improves operational flexibility.

Advantage 9: An advantage of using the same hydraulic power unit 610 to supply hydraulic power to both the propulsion system and exhaust capture system 500, is the reduction of the number of hydraulic power units required and reducing the capital cost, which reduces capital cost and improves cost-effectiveness.

While the above detailed description contains many specificities, these should not be construed as limitations on the scope, but rather as an exemplification of one [or several] embodiment(s) thereof. Many other variations are possible. For example,

I claim:

1. A self-propelled emissions control servicing watercraft, for servicing an ocean-going vessel stationed at-berth or at-anchorage, said emissions control servicing watercraft comprising:
    a floating platform barge;
    an emissions processing unit system mounted to the floating platform barge and configured during a service mode of the servicing watercraft to purify exhaust from said serviced vessel;
    an exhaust capture system mounted to the floating platform barge during the service mode for capturing an exhaust from an exhaust pipe of the ocean-going vessel and conveying said exhaust to said emissions processing system, the exhaust capture system including an exhaust capture tower and arm, the exhaust capture tower and arm configured to engage the exhaust pipe of the serviced vessel once the barge has been secured next to the serviced vessel with the emissions control servicing watercraft in a servicing mode, the exhaust capture tower and arm configured to be disengaged from the serviced vessel and stowed on the barge when not in the service mode;
    a plurality of hydraulic thrusters for propelling the floating platform barge;
    a hydraulic power unit positioned on the floating platform barge and connected to the plurality of hydraulic thrusters and to the emissions capture system;
    wherein the servicing watercraft has two modes of operation which are exclusive of each other, a mobile mode in which the hydraulic power unit is connected to the plurality of hydraulic thrusters and disconnected from the exhaust capture system to self-propel the barge without the aid of tugboats to or from the serviced vehicle, and a service mode in which the hydraulic power unit is disconnected from the plurality of hydraulic thrusters and is connected to the exhaust capture system to provide hydraulic power to the exhaust capture system for connection and disconnection from the serviced vessel.

2. A method for emissions control comprising:
    providing a self-propelled emissions control vessel as in claim 1;
    selecting a serviced at-berth or at-anchorage ocean-going vessel;
    operating said emission control vessel in the mobile mode to propel the emission control vessel to a position next to the selected serviced vessel without the aid of tugboats;
    operating said emission control vessel in the service mode;
    with the hydraulic power unit disconnected from the plurality of hydraulic thrusters and connected to the exhaust capture system, positioning the exhaust capture system in relation to the exhaust pipe located on top of a funnel of said selected serviced vessel to engage the selected serviced vessel, and drawing an exhaust from said exhaust pipe for purification by said emissions processing system;
    with the servicing watercraft in the service mode, disengaging the exhaust capture system from the selected serviced vessel and stowing the emission control system on the floating platform barge;
    configuring the servicing watercraft in the mobile mode, connecting the hydraulic power unit to the at least one of the hydraulic thrusters with the hydraulic power unit disconnected from the exhaust capture system, and propelling the floating platform away from the serviced ocean-going vessel without the aid of tugboats.

* * * * *